Dec. 8, 1959   E. R. ZIEGLER   2,915,772
WINDSHIELD CLEANING SYSTEM
Filed Sept. 18, 1958   2 Sheets-Sheet 1

INVENTOR.
Eugene R. Ziegler
BY
*W.E. Finher*
His Attorney

United States Patent Office 2,915,772
Patented Dec. 8, 1959

2,915,772

WINDSHIELD CLEANING SYSTEM

Eugene R. Ziegler, Spencerport, N.Y., assignor to General Motors Corporation, Detroit, Mich., a corporation of Delaware Application September 18, 1958, Serial No. 761,746

9 Claims. (Cl. 15—255)

This invention pertains to the art of windshield cleaning, and particularly to improved cleaning mechanism for compound curved wrap-around windshields.

Heretofore, various mechanisms have been devised to improve the efficiency of conventional wiper apparatus in cleaning the severely curved portion of wrap-around windshields. It has been recognized that if a conventional flexible wiper blade is maintained in a substantially vertical position when it traverses the severely curved wrap-around portions of the windshield, the blade will clean these areas more efficiently and provide better vision for the driver. The present invention relates to improved means for obtaining the desired wiping pattern wherein the wiper blade is moved to a substantially vertical position at its outboard stroke end while assuming a substantially horizontal position at the inboard stroke end. Accordingly, among my objects are the provision of a windshield cleaning mechanism including means for automatically varying the position of the wiper blade relative to the wiper arm means to more efficiently clean a wrap-around windshield; the further provision of windshield cleaning mechanism including a pair of oscillatory drive arms; and the still further provision of windshield cleaning mechanism including a pair of oscillatory drive arms which have lost motion connections at longitudinally spaced points with a wiper blade.

The aforementioned and other objects are accomplished in the present invention by employing a pair of drive arms having spring hinge connected inner and outer sections, the two wiper arms being maintained in parallel relationship in one plane while free to move out of parallel relationship in a plane at right angles thereto. Specifically, the improved windshield cleaning mechanism comprises a pair of wiper arms, the inner sections of which are drivingly connected with a pair of spaced oscillatory pivot shafts. The outer section of each wiper arm is operatively connected with a roller disposed in an elongated slot in the pressure applying linkage of a wiper blade. The wiper blade may be of any conventional type suitable for wiping curved windshields, and thus includes a squeegee unit which is freely flexible in a plane normal to the surface to be wiped and substantially inflexible in a plane parallel to the surface to be wiped.

The primary pressure distributing member of the blade linkage has a pair of elongate slots therein which receive the rollers attached to the outer end of the wiper arms. Moreover, while the arms are rigidly connected so as to remain in parallel planes that are normal to the surface to be wiped, the outer sections of the wiper arms can move relative to each other so as to be nonparallel in a plane parallel to the windshield surface.

In operation, oscillatory movement is imparted to both wiper arms, so that both wiper arms apply torque to the wiper blade. The wiper blade is controlled at all times by the rollers, since one of the rollers will always be disposed adjacent the end of its respective slot in the wiper blade linkage. Since one of the wiper arms has a shorter outer section than the other wiper arm, the angular relationship between the wiper blade and arms will vary continuously during oscillatory movement thereof from the inboard stroke end position to the outboard stroke end position thereby resulting in the wiper blade assuming a substantially vertical position adjacent the outboard stroke end and a substantially horizontal position adjacent the inboard stroke end.

Further objects and advantages of the present invention will be apparent from the following description, reference being had to the accompanying drawing, wherein a preferred embodiment of the present invention is clearly shown.

Figures 1, 2:
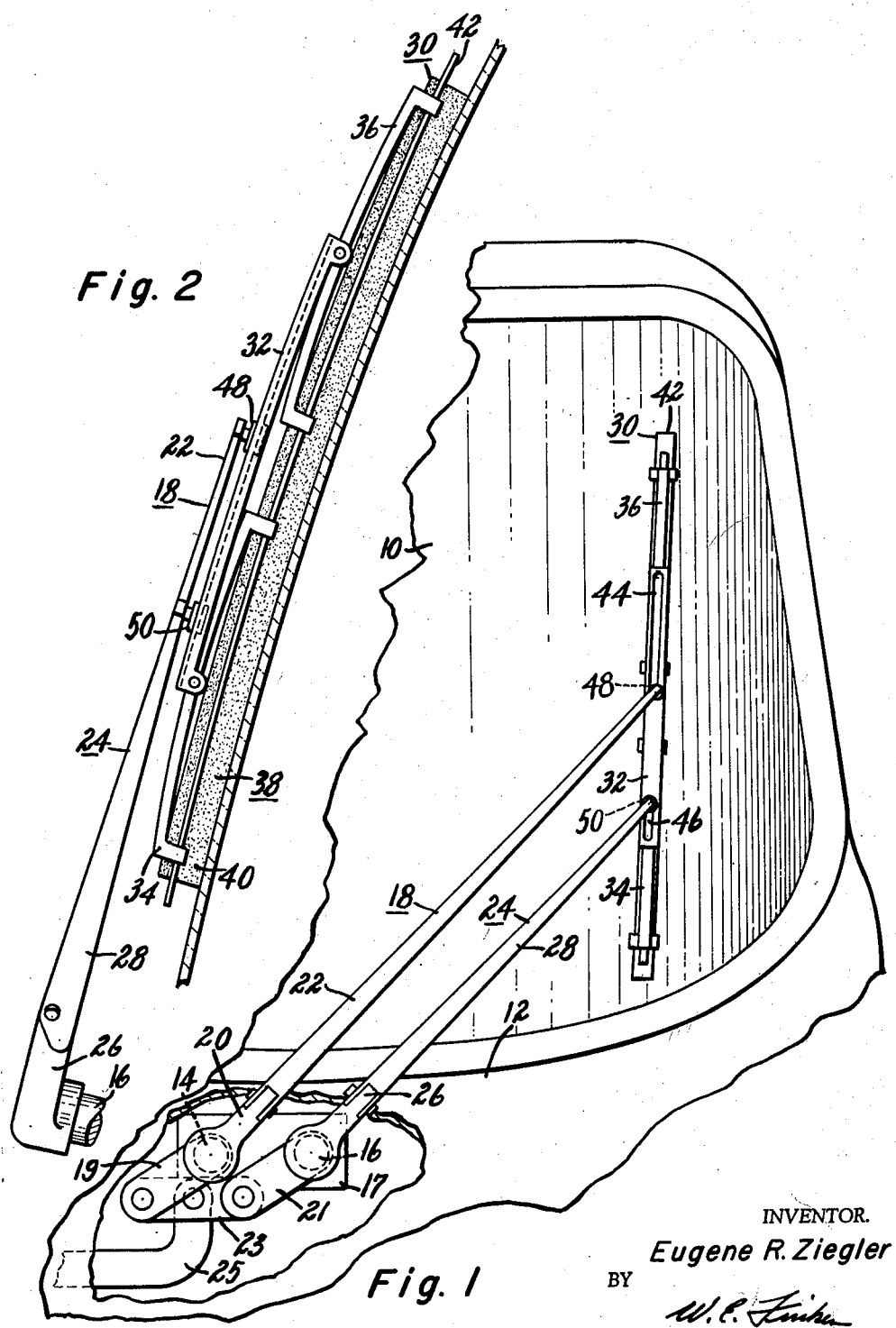
Figure 1 is a fragmentary view, partly in section and partly in elevation of a portion of a vehicle equipped with the windshield cleaning mechanism of this invention.
Figure 2 is a view in elevation depicting the windshield cleaning mechanism adjacent the outboard stroke end position of the wiper blade.

With particular reference to Figure 1, a portion of a vehicle is shown including a wrap-around windshield 10 and a cowl 12. A pair of spaced pivot shafts 14 and 16 are rotatably journalled in a bracket 17, disposed beneath the cowl 12. The pivot shafts have crank arms 19 and 21 attached thereto. The crank arms 19 and 21 are interconnected by a link 23, to which is movably connected to a reciprocable link 25 so that the pivot shafts will be oscillated in unison, from a windshield wiper motor, not shown. A first wiper arm 18 having spring hinge connected inner and outer sections 20 and 22 is drivingly connected with the pivot shaft 14. A second, and shorter wiper arm 24 is drivingly connected with the pivot shaft 16, the arm 24 likewise having spring hinge connected inner and outer sections 26 and 28.

With reference to Figure 2, the outer sections 22 and 28 of the wiper arms 18 and 24 are operatively connected to a wiper blade generally indicated by the numeral 30. By way of example, the wiper blade includes a pressure distributing linkage comprising a primary pressure distributing member, or yoke, 32 and a pair of secondary pressure distributing members, or yokes, 34 and 36 pivotally connected to the ends of the primary yoke. Opposite ends of the secondary yokes are movably connected with a squeegee unit indicated by numeral 38. The squeegee unit comprises an elongate elastomeric wiper element 40 and a metallic backing strip 42 whereby the squeegee unit is freely flexible in a plane normal to the surface to be wiped and substantially inflexible in a plane parallel to the surface to be wiped.

Figure 3:
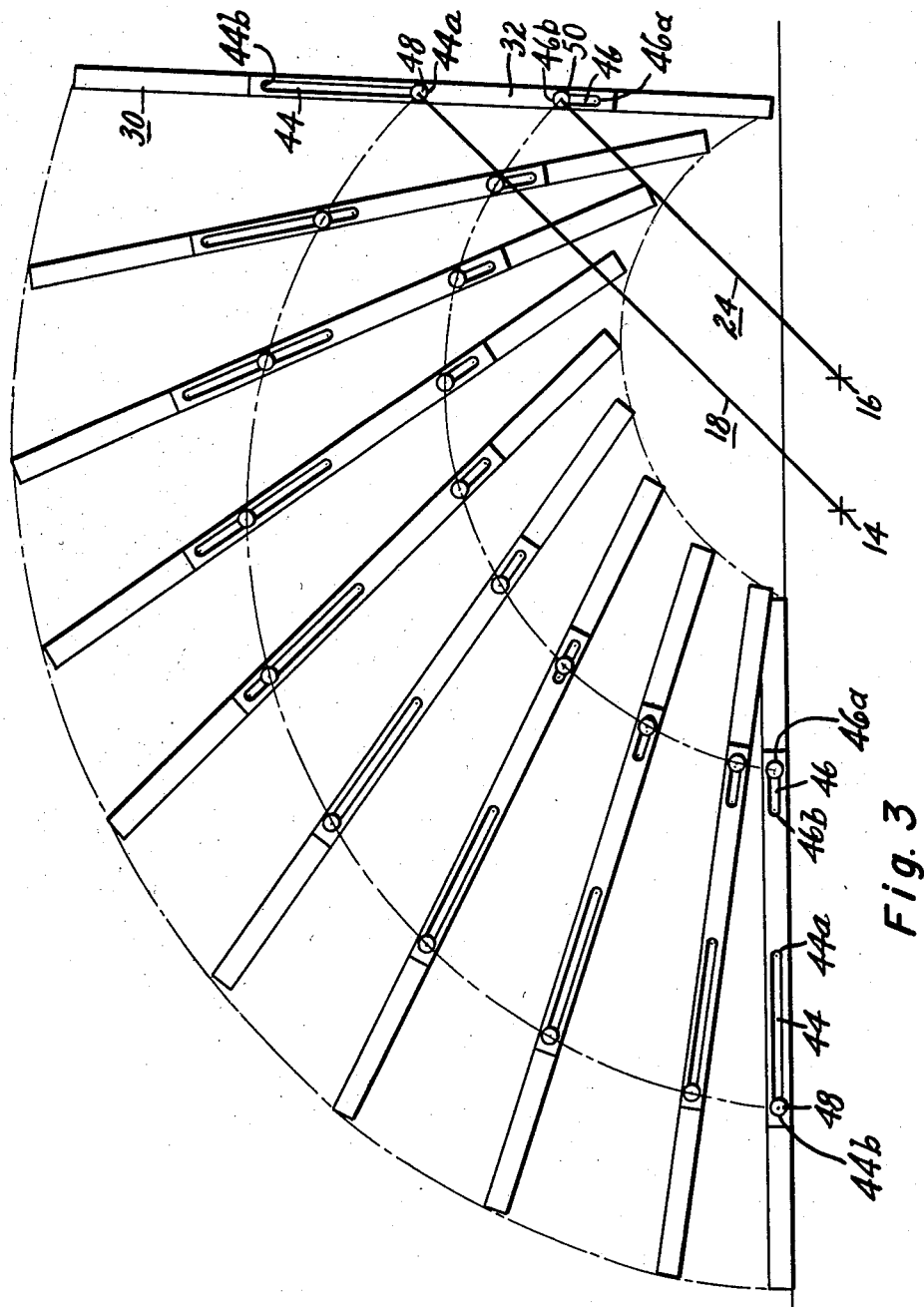
Figure 3 is an enlarged view indicating the wiping pattern produced by the cleaning mechanism of this invention with the blade and arms being indicated in several positions.

With reference to Figure 3, the wiper arms 18 and 24 apply wiping pressure to the wiper blade 30 due to their spring hinge connected inner and outer sections. The channel-shaped primary yoke 32 of the wiper blade is formed with a pair of elongated slots 44 and 46. The outer section 22 of the wiper arm 18 carries a grooved roller 48 which is received in the elongated slot 44, and the outer section of the arm 24 carries a grooved roller 50 received in the slot 46.

The inboard and outboard stroke limits of the wiper blades 30 are shown in Figure 3, the wiper blade being substantially horizontal at the inboard stroke end limit and substantially vertical at the outboard stroke end limit. When the wiper blade 30 is at the outboard stroke end limit, the roller 48 engages end 44a of the slot 44 and the roller 50 engages end 46b of the slot 46. When the wiper blade 30 is at the inboard stroke end position, the roller 48 engages the end 44b of the slot 44 while the roller 50 engages the end 46a of the slot 46.

During movement of the wiper blade 30 from the inboard stroke end to the outboard stroke end, the angular relation between the blade and the arms in a plane parallel to the windshield surface varies. Moreover, the position of the blade relative to the arms is controlled by the location of the rollers 48 and 50 within the slots 44 and 46. As clearly shown in Figure 3, during substantially the entire oscillatory stroke of the wiper arms, one of the rollers, either 48 or 50, engages the end of its respective slot so as to positively control the angular position of the wiper blade 30.

As seen particularly in Figures 2 and 3, while the wiper arms 18 and 24 remain substantially parallel to each other when viewed from the front of the vehicle, the outer sections 22 and 28 of the arms 18 and 24 are moved out of the parallelism as the wiper blade traverses the severely curved portions of the windshield. This phenomenon occurs due to the fact that the outer sections of the wiper arms tend to follow the contour of the windshield 30 as permitted by the spring hinge connections between the inner and outer sections of the wiper arms.

In operation, the wiper pivot shafts 14 and 16 are oscillated throughout the same stroke in unison. Accordingly, both wiper arms 18 and 24 apply torque to the wiper blade. However, due to the lost motion connection between the wiper arms and the wiper blade, the angular relation between the wiper blade and the arms will change continuously during the stroke of the wiper blade as indicated in Figure 3. The improved wiper arm drive mechanism of this invention will position the blade in a substantially vertical position adjacent the outboard stroke end position which is the most severely curved portion of the wrap-around windshield and thereby more adequately clean this portion of the windshield, and provide better vision for the driver.

While the embodiment of the invention as herein disclosed constitutes a preferred form, it is to be understood that other forms might be adopted.

What is claimed is as follows:

1. Windshield cleaning mechanism for a curved windshield including, a wiper blade, a pair of spaced wiper arms, means rigidly interconnecting said wiper arms for oscillation in unison, one of said arms being of greater length than the other arm, and means including lost motion connections between the outer ends of said arms and said wiper blade to continuously vary the angular relationship between said blade and said arms during the oscillatory stroke thereof.

2. Windshield cleaning mechanism including, a wiper blade, a pair of spaced drive arms, means rigidly interconnecting said arms for oscillation in unison, said arms being of different length, and means including lost motion connections between the outer ends of said arms and said wiper blade whereby the angular relationship between said blade and said arms will vary continuously throughout the oscillatory stroke thereof.

3. Windshield cleaning mechanism including, a pair of spaced pivot shafts, means interconnecting said pivot shafts for oscillation in unison, a pair of wiper arms drivingly connected with said pivot shafts, said arms being of different length, a wiper blade, and means including lost motion connections between the outer ends of said arms and said wiper blade whereby the angular relationship between said blade and said arms will vary continuously throughout the oscillatory stroke thereof.

4. Windshield cleaning mechanism for a curved windshield including, a wiper blade, a pair of spaced pivot shafts, means interconnecting said pivot shafts for oscillation in unison, a pair of wiper arms drivingly connected with said pivot shafts, said wiper arms including spring hinge connected inner and outer sections, the outer section of one of said arms being of greater length than the outer section of the other arm, and means including lost motion connections between the outer sections of said arms and said wiper blade to continuously vary the angular relationship between said blade and said arms during the oscillatory stroke thereof.

5. Windshield cleaning mechanism for a curved windshield including a wiper blade comprising a pressure distributing linkage and a squeegee unit, said squeegee unit being flexible in a plane normal to the surface to be wiped and substantially inflexible in a plane parallel to said surface, a pair of oscillatory wiper arms including spring hinge connected inner and outer sections, means rigidly interconnecting said wiper arms for oscillation in unison, the outer sections of said arms being of greater length, and means including lost motion connection between the outer end of said arms and said wiper blade whereby the angular relationship between said blade and said arms will vary continuously during the oscillatory stroke thereof.

6. Windshield cleaning mechanism for a curved windshield including, a wiper blade including a pressure distributing linkage and a squeegee unit, said squeegee unit being flexible in a plane normal to the surface to be cleaned and substantially inflexible in a plane parallel to said surface, a pair of spaced wiper arms, means rigidly interconnecting said wiper arms for oscillation in unison, one of said arms being of greater length than the other arm, and means including lost motion connections between the outer end of said arms and the pressure distributing linkage of said wiper blade whereby the angular relationship between said blade and said arms will vary continuously during the oscillatory stroke thereof.

7. The cleaning mechanism set forth in claim 6 wherein said wiper arms include spring hinge connected inner and outer sections.

8. The cleaning mechanism set forth in claim 6 wherein said pressure distributing linkage comprises a primary pressure distributing member having a pair of elongated slots therein, and wherein the lost motion connections between the outer ends of said arms and said pressure distributing linkage comprises a roller attached to each arm and disposed within one of said slots.

9. The mechanism set forth in claim 8 wherein said primary pressure distributing member is of channel-shape, wherein said slots are located in the base of said channel, and wherein said rollers are grooved to receive the edge portions of said slots.

References Cited in the file of this patent

UNITED STATES PATENTS

| 2,809,388 | Wise | Oct. 15, 1957 |
| 2,811,736 | Kurkechian | Nov. 5, 1957 |

FOREIGN PATENTS

| 1,029,855 | France | Mar. 11, 1953 |
| 1,032,359 | France | Mar. 25, 1953 |